United States Patent
Li et al.

(10) Patent No.: US 10,334,565 B2
(45) Date of Patent: Jun. 25, 2019

(54) TERMINAL, BASE STATION, NETWORK CONTROLLER, SYSTEM, AND TRANSMISSION METHOD

(71) Applicant: Huawei Technologies Co., Ltd., Shenzhen (CN)

(72) Inventors: Yingtao Li, Shenzhen (CN); Bingfu Wang, Shenzhen (CN); Yalin Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 26 days.

(21) Appl. No.: 15/473,138

(22) Filed: Mar. 29, 2017

(65) Prior Publication Data
US 2017/0201966 A1 Jul. 13, 2017

Related U.S. Application Data

(63) Continuation of application No. PCT/CN2014/088039, filed on Sep. 30, 2014.

(51) Int. Cl.
*H04W 72/04* (2009.01)
*H04W 72/14* (2009.01)
*H04W 74/08* (2009.01)

(52) U.S. Cl.
CPC ....... *H04W 72/04* (2013.01); *H04W 72/0406* (2013.01); *H04W 72/048* (2013.01);
(Continued)

(58) Field of Classification Search
CPC ................................. H04W 4/70; H04W 76/28
See application file for complete search history.

(56) References Cited

U.S. PATENT DOCUMENTS

2008/0043681 A1\* 2/2008 Vimpari ............... H04B 7/2656
370/335
2013/0017779 A1\* 1/2013 Song .................... H04W 76/45
455/39
(Continued)

FOREIGN PATENT DOCUMENTS

| CN | 101080097 A | 11/2007 |
| CN | 101599896 A | 12/2009 |

(Continued)

OTHER PUBLICATIONS

Luo et al., "Experiment and Analysis of Weixin's Effects on Mobile Network," Research & Development (2013).
(Continued)

*Primary Examiner* — Jung H Park
(74) *Attorney, Agent, or Firm* — Leydig, Voit & Mayer, Ltd.

(57) ABSTRACT

The present disclosure discloses a terminal, a base station, a network controller, a system, and a transmission method. The terminal includes: a receiving module, configured to receive configuration information of at least one air interface-specific path sent by a base station, where the air interface-specific path is used to transmit application data corresponding to at least one application; and a sending module, configured to: if the to-be-sent application data is discontinuously transmitted and has a length less than a preset threshold, use the at least one air interface-specific path to send the application data to the base station. According to embodiments of the present disclosure, when a terminal transmits data or signaling that is discontinuous and has a relatively small length, consumption of network signaling resources is reduced, so that a normal network service properly runs.

6 Claims, 6 Drawing Sheets

(52) U.S. Cl.
CPC ........... *H04W 72/14* (2013.01); *H04W 74/08* (2013.01); *H04W 72/042* (2013.01)

(56) References Cited

U.S. PATENT DOCUMENTS

| | | |
|---|---|---|
| 2013/0058289 A1 | 3/2013 | Park et al. |
| 2014/0112143 A1 | 4/2014 | Beale et al. |
| 2015/0003375 A1 | 1/2015 | Liu et al. |
| 2015/0358967 A1 | 12/2015 | Xie et al. |
| 2016/0044740 A1* | 2/2016 | Siomina ................ H04W 72/02 455/552.1 |

FOREIGN PATENT DOCUMENTS

| | | |
|---|---|---|
| CN | 102056312 A | 5/2011 |
| CN | 103260250 A | 8/2013 |
| CN | 103609190 A | 2/2014 |
| CN | 103650623 A | 3/2014 |
| EP | 2806702 A1 | 11/2014 |
| WO | WO 2011050669 A1 | 5/2011 |
| WO | 2013120456 A1 | 8/2013 |
| WO | 2014048345 A1 | 4/2014 |

OTHER PUBLICATIONS

Luo et al., "Technical Test and Analysis on the Influence of WeChat," Research & Development (2013).
"Solution for the small data bearer service without using user plane RABs," 3GPP TSG-SA WG2 Meeting #92, Barcelona, Spain, S2-122896, XP050633418, 3rd Generation Partnership Project, Valbonne, France (Jul. 9-13, 2012).
European Office Action dated Mar. 4, 2019, Application No. EU 14903083.5-1215.

* cited by examiner

TERMINAL, BASE STATION, NETWORK CONTROLLER, SYSTEM, AND TRANSMISSION METHOD

CROSS-REFERENCE TO RELATED APPLICATIONS

This application is a continuation of International Application No. PCT/CN2014/088039, filed on Sep. 30, 2014, the disclosure of which is hereby incorporated by reference in its entirety.

TECHNICAL FIELD

The present disclosure relates to the field of communications technologies and, in particular, to a terminal, a base station, a network controller, a system, and a transmission method.

BACKGROUND

With development of mobile Internet technologies, and in particular, with the emerging and popularization of intelligent terminals, such as mobile phones and tablet computers, an increasing quantity of users directly use these terminals to access a network. In addition, with rapid development of operating systems and hardware performance of terminals, a large quantity of software previously used on a computer may be used on intelligent, miniaturized, and mobile terminals, and in particular, social software is frequently used. Such software is generally instant messaging software, and a connection between the software and a network is characterized by being abrupt and timed. A piece of instant messaging software is used as an example. The software sends a heartbeat packet on an operating system of a terminal every two minutes, so that the terminal periodically notifies a server of a state of the terminal. For this purpose, a network controller needs to transmit tens of network signaling messages, such as access signaling and bearer setup signaling, and after transmission is completed, the network controller releases an air interface resource after 7-15 seconds. In one month, even if a user using the instant messaging software does not perform any operation, 22320 heartbeat packets are sent, which is equivalent to consuming a signaling processing capability of sending 22320 SMS messages, or equivalent to a signaling processing capability of making more than 10000 calls, with only 1.83 megabytes of traffic generated.

It can be learned that when a terminal uses instant messaging software, the terminal generates a large amount of network signaling to maintain a connection to a server, and the generated signaling is intended only to perform transmission of a few bytes. In a severe case, the signaling may cause interference to a normal service of a network. In addition, when a future development prospect of a network is considered, a large quantity of terminals are to be connected to the network, and similar to sending an instant message, many terminals discontinuously send data of little content and a small length to the network, and as terminals increase, a large quantity of network signaling resources are consumed.

SUMMARY

Embodiments of the present disclosure provide a terminal, a base station, a network controller, a system, and a transmission method, so as to resolve a problem that a normal service of a network is interfered because of over-consumption of network signaling resources when a terminal transmits data or signaling that is discontinuous and has a relatively small length.

A first aspect of the embodiments of the present disclosure provides a terminal, which may include:

a receiving module, configured to receive configuration information of at least one air interface-specific path sent by a base station, where the air interface-specific path is used to transmit application data corresponding to at least one application; and a sending module, configured to: if the to-be-sent application data is discontinuously transmitted and has a length less than a preset threshold, use the at least one air interface-specific path to send the application data to the base station.

In a first possible implementation manner of the first aspect, the terminal is in an idle state.

With reference to the first aspect or with reference to the first possible implementation manner of the first aspect, in a second possible implementation manner, the configuration information of the air interface-specific path includes time-frequency resource information and link resource information of the air interface-specific path.

With reference to the second possible implementation manner of the first aspect, in a third possible implementation manner, the terminal and another terminal contend for using a time-frequency resource of the air interface-specific path.

With reference to the first aspect or with reference to the first or the second possible implementation manner of the first aspect, in a fourth possible implementation manner, the receiving module is further configured to receive time-frequency resource allocation information sent by the base station, and the sending module is further configured to use a time-frequency resource of the air interface-specific path according to the time-frequency resource allocation information.

With reference to the first aspect or with reference to the first, or the second, or the third, or the fourth possible implementation manner of the first aspect, in a fifth possible implementation manner, the receiving module is further configured to receive application data that is sent by the base station by using the at least one air interface-specific path.

With reference to the first aspect or with reference to the first, or the second, or the third, or the fourth, or the fifth possible implementation manner of the first aspect, in a sixth possible implementation manner, the receiving module is further configured to receive control signaling sent by the base station, and if the control signaling carries indication information of using the air interface-specific path, the sending module is further configured to use the air interface-specific path to transmit the application data that is discontinuously transmitted and has a length less than the preset threshold.

A second aspect of the embodiments of the present disclosure provides a terminal, including:

an input apparatus, an output apparatus, a memory, and a processor; where the memory is configured to store a program, and the processor is configured to call the program to execute the following steps:

receiving configuration information of at least one air interface-specific path sent by a base station, where the air interface-specific path is used to transmit application data corresponding to at least one application; and if the to-be-sent application data is discontinuously transmitted and has a length less than a preset threshold, using the at least one air interface-specific path to send the application data to the base station.

In a first possible implementation manner of the second aspect, the terminal is in an idle state.

With reference to the second aspect or with reference to the first possible implementation manner of the second aspect, in a second possible implementation manner, the configuration information of the air interface-specific path includes time-frequency resource information and link resource information of the air interface-specific path.

With reference to the second possible implementation manner of the second aspect, in a third possible implementation manner, the terminal and another terminal contend for using a time-frequency resource of the air interface-specific path.

With reference to the second aspect or with reference to the first or the second possible implementation manner of the second aspect, in a fourth possible implementation manner, the processor is further configured to receive time-frequency resource allocation information sent by the base station, and use a time-frequency resource of the air interface-specific path according to the time-frequency resource allocation information.

With reference to the second aspect or with reference to the first, or the second, or the third, or the fourth possible implementation manner of the second aspect, in a fifth possible implementation manner, the processor is further configured to receive application data that is sent by the base station by using the at least one air interface-specific path.

With reference to the second aspect or with reference to the first, or the second, or the third, or the fourth, or the fifth possible implementation manner of the second aspect, in a sixth possible implementation manner, the processor is further configured to receive control signaling sent by the base station, and if the control signaling carries indication information of using the air interface-specific path, the processor is further configured to use the air interface-specific path to transmit the application data that is discontinuously transmitted and has a length less than the preset threshold.

A third aspect of the embodiments of the present disclosure provides a base station, which may include:

a sending module, configured to send an air interface resource request to a network controller, requesting the network controller to allocate an air interface-specific path resource;

an obtaining module, configured to obtain an air interface-specific path resource allocated by the network controller;

an allocation module, configured to allocate the air interface-specific path resource to a terminal;

a mapping module, configured to map at least one air interface-specific path with at least one network-specific path; and a forwarding module, configured to receive application data that is sent by the terminal by using the at least one air interface-specific path and that is discontinuously transmitted and has a length less than a preset threshold, and forward the application data to the gateway by using the at least one network-specific path mapped with the at least one air interface-specific path, where both the air interface-specific path and the network-specific path are used to transmit application data corresponding to at least one application.

In a first possible implementation manner of the third aspect, the air interface-specific path resource includes time-frequency resource information and link resource information.

With reference to the third aspect or with reference to the first possible implementation manner of the third aspect, in a second possible implementation manner, the base station further includes:

a monitoring module, configured to monitor utilization information of the air interface-specific path; where:

the allocation module is further configured to adjust the air interface-specific path resource according to the utilization information of the air interface-specific path; and the sending module is further configured to send the adjusted air interface path resource to the terminal for use by the terminal.

With reference to the third aspect or with reference to the first or the second possible implementation manner of the third aspect, in a third possible implementation manner, the forwarding module is further configured to receive application data that is sent by the gateway by using the at least one network-specific path and that is discontinuously transmitted and has a length less than a preset threshold, and forward the application data to the terminal by using the at least one air interface-specific path mapped with the at least one network-specific path.

A fourth aspect of the embodiments of the present disclosure provides a base station, which may include:

an input apparatus, an output apparatus, a memory, and a processor; where the memory is configured to store a program, and the processor is configured to call the program to execute the following steps:

sending an air interface resource request to a network controller, requesting the network controller to allocate an air interface-specific path resource;

obtaining an air interface-specific path resource allocated by the network controller;

allocating the air interface-specific path resource to a terminal;

mapping at least one air interface-specific path with at least one network-specific path; and receiving application data that is sent by the terminal by using the at least one air interface-specific path and that is discontinuously transmitted and has a length less than a preset threshold, and forwarding the application data to the gateway by using the at least one network-specific path mapped with the at least one air interface-specific path, where both the air interface-specific path and the network-specific path are used to transmit application data corresponding to at least one application.

In a first possible implementation manner of the fourth aspect, the air interface-specific path resource includes time-frequency resource information and link resource information.

With reference to the fourth aspect or with reference to the first possible implementation manner of the fourth aspect, in a second possible implementation manner, the processor is further configured to execute the following steps:

monitoring utilization information of the air interface-specific path;

adjusting the air interface-specific path resource according to the utilization information of the air interface-specific path; and sending the adjusted air interface path resource to the terminal for use by the terminal.

With reference to the fourth aspect or with reference to the first or the second possible implementation manner of the fourth aspect, in a third possible implementation manner, the processor is further configured to receive application data that is sent by the gateway by using the at least one network-specific path and that is discontinuously transmitted and has a length less than a preset threshold, and forward the application data to the terminal by using the at least one air interface-specific path mapped with the at least one network-specific path.

A fifth aspect of the embodiments of the present disclosure provides a network controller, which may include:

a receiving module, configured to receive a first resource control request sent by a base station;

an allocation module, configured to allocate an air interface-specific path resource to the base station; where the receiving module is further configured to receive a second resource control request sent by a gateway; and the allocation module is further configured to allocate a network-specific path resource to the gateway; and a sending module, configured to send a control instruction to the base station, where the control instruction is used to instruct the base station to instruct a terminal to use at least one air interface-specific path and at least one network-specific path to send application data that is discontinuously transmitted and has a length less than a preset threshold, where both the air interface-specific path and the network-specific path are used to transmit application data corresponding to at least one application.

In a first possible implementation manner of the fifth aspect, the allocation module allocates the air interface-specific path resource to the base station and allocates the network-specific path resource to the gateway, based on a policy database.

With reference to the fifth aspect or with reference to the first possible implementation manner of the fifth aspect, in a second possible implementation manner, the receiving module is further configured to receive utilization information of the air interface-specific path sent by the base station, and utilization information of the network-specific path sent by a gateway on the network-specific path;

the sending module is further configured to store the utilization information of the air interface-specific path and the utilization information of the network-specific path in the policy database; and the allocation module is further configured to allocate the air interface-specific path resource according to the utilization information of the air interface-specific path, and allocate the network-specific path resource according to the utilization information of the network-specific path, and send control information to the base station according to the utilization information of the air interface-specific path, so that the base station adjusts allocation of the air interface-specific path resource.

With reference to the fifth aspect or with reference to the first, or the second possible implementation manner of the fifth aspect, in a third possible implementation manner, the receiving module is further configured to receive the utilization information of the air interface-specific path sent by the base station and the utilization information of the network-specific path sent by the gateway on the network-specific path;

the sending module is further configured to store the utilization information of the air interface-specific path and the utilization information of the network-specific path in the policy database; and the network controller further includes:

a charging module, configured to charge according to the utilization information of the air interface-specific path and the utilization information of the network-specific path.

A sixth aspect of the embodiments of the present disclosure provides a network controller, which may include:

an input apparatus, an output apparatus, a memory, and a processor; where the memory is configured to store a program, and the processor is configured to call the program to execute the following steps:

receiving a first resource control request sent by a base station, and allocating an air interface-specific path resource to the base station;

receiving a second resource control request sent by a gateway, and allocating a network-specific path resource to the gateway; and sending a control instruction to the base station, where the control instruction is used to instruct the base station to instruct a terminal to use at least one air interface-specific path and at least one network-specific path to send application data that is discontinuously transmitted and has a length less than a preset threshold, where both the air interface-specific path and the network-specific path are used to transmit application data corresponding to at least one application.

In a first possible implementation manner of the sixth aspect, the processor allocates the air interface-specific path resource to the base station and allocates the network-specific path resource to the gateway, based on a policy database.

With reference to the sixth aspect or with reference to the first possible implementation manner of the sixth aspect, in a second possible implementation manner, the processor is further configured to: receive utilization information of the air interface-specific path sent by the base station, and utilization information of the network-specific path sent by a gateway on the network-specific path;

store the utilization information of the air interface-specific path and the utilization information of the network-specific path in the policy database; and allocate the air interface-specific path resource according to the utilization information of the air interface-specific path, and allocate the network-specific path resource according to the utilization information of the network-specific path, and send control information to the base station according to the utilization information of the air interface-specific path, so that the base station adjusts allocation of the air interface-specific path resource.

With reference to the sixth aspect or with reference to the first, or the second possible implementation manner of the sixth aspect, in a third possible implementation manner, the processor is further configured to receive the utilization information of the air interface-specific path sent by the base station and the utilization information of the network-specific path sent by the gateway on the network-specific path;

store the utilization information of the air interface-specific path and the utilization information of the network-specific path in the policy database; and charge according to the utilization information of the air interface-specific path and the utilization information of the network-specific path.

A seventh aspect of the embodiments of the present disclosure provides a system, which may include:

the terminal according to any implementation manner of the first aspect of the embodiments of the present disclosure;

the base station according to any implementation manner of the third aspect of the embodiments of the present disclosure;

the network controller according to any implementation manner of the fifth aspect of the embodiments of the present disclosure; and a gateway, configured to connect to the base station by using at least one network-specific path, and transmit application data that is discontinuously transmitted and has a length less than a preset threshold.

An eighth aspect of the present disclosure provides a transmission method, which may include:

receiving, by a terminal, configuration information of at least one air interface-specific path sent by a base station, where the air interface-specific path is used to transmit application data corresponding to at least one application; and if the to-be-sent application data is discontinuously transmitted and has a length less than a preset threshold, using, by the terminal, the at least one air interface-specific path to send the application data to the base station.

In a first possible implementation manner of the eighth aspect, the terminal is in an idle state.

With reference to the eighth aspect or with reference to the first possible implementation manner of the eighth aspect, in a second possible implementation manner, the configuration information of the air interface-specific path includes time-frequency resource information and link resource information of the air interface-specific path.

With reference to the second possible implementation manner of the eighth aspect, in a third possible implementation manner, the terminal and another terminal contend for using a time-frequency resource of the air interface-specific path.

With reference to the eighth aspect or with reference to the first or the second possible implementation manner of the eighth aspect, in a fourth possible implementation manner, the terminal receives time-frequency resource allocation information sent by the base station, and uses a time-frequency resource of the air interface-specific path according to the time-frequency resource allocation information.

With reference to the eighth aspect or with reference to the first, or the second, or the third, or the fourth possible implementation manner of the eighth aspect, in a fifth possible implementation manner, the terminal receives application data that is sent by the base station by using the at least one air interface-specific path.

With reference to the eighth aspect or with reference to the first, or the second, or the third, or the fourth, or the fifth possible implementation manner of the eighth aspect, in a sixth possible implementation manner, the terminal receives control signaling sent by the base station, and if the control signaling carries indication information of using the air interface-specific path, uses the air interface-specific path to transmit the application data that is discontinuously transmitted and has a length less than the preset threshold.

A ninth aspect of the embodiments of the present disclosure provides a computer storage medium, where the computer storage medium stores a program, and the program executes all or some steps of the transmission method provided in the eighth aspect of the embodiments of the present disclosure.

A tenth aspect of the embodiments of the present disclosure provides a transmission method, which may include:

sending, by a base station, an air interface resource request to a network controller, requesting the network controller to allocate an air interface-specific path resource;

obtaining, by the base station, an air interface-specific path resource allocated by the network controller;

allocating, by the base station, the air interface-specific path resource to a terminal; and mapping at least one air interface-specific path with at least one network-specific path, and receiving application data that is sent by the terminal by using the at least one air interface-specific path and that is discontinuously transmitted and has a length less than a preset threshold, and forwarding the application data to the gateway by using the at least one network-specific path mapped with the at least one air interface-specific path, where both the air interface-specific path and the network-specific path are used to transmit application data corresponding to at least one application.

In a first possible implementation manner of the tenth aspect, the air interface-specific path resource includes time-frequency resource information and link resource information.

With reference to the tenth aspect or with reference to the first possible implementation manner of the tenth aspect, in a second possible implementation manner, the method further includes:

monitoring, by the base station, utilization information of the air interface-specific path;

adjusting the air interface-specific path resource according to the utilization information of the air interface-specific path; and sending the adjusted air interface path resource to the terminal for use by the terminal.

With reference to the tenth aspect or with reference to the first or the second possible implementation manner of the tenth aspect, in a third possible implementation manner, the method further includes:

receiving, by the base station, application data that is sent by the gateway by using the at least one network-specific path and that is discontinuously transmitted and has a length less than a preset threshold, and forwarding the application data to the terminal by using the at least one air interface-specific path mapped with the at least one network-specific path.

An eleventh aspect of the embodiments of the present disclosure provides a computer storage medium, where the computer storage medium stores a program, and the program executes all or some steps of the transmission method provided in the tenth aspect of the embodiments of the present disclosure.

A twelfth aspect of the embodiments of the present disclosure provides a transmission method, which may include:

receiving, by a network controller, a first resource control request sent by a base station, and allocating an air interface-specific path resource to the base station;

receiving, by the network controller, a second resource control request sent by a gateway, and allocating a network-specific path resource to the gateway; and sending, by the network controller, a control instruction to the base station, where the control instruction is used to instruct the base station to instruct a terminal to use at least one air interface-specific path and at least one network-specific path to send application data that is discontinuously transmitted and has a length less than a preset threshold, where both the air interface-specific path and the network-specific path are used to transmit application data corresponding to at least one application.

In a first possible implementation manner of the twelfth aspect, the network controller allocates the air interface-specific path resource to the base station and allocates the network-specific path resource to the gateway, based on a policy database.

With reference to the twelfth aspect or with reference to the first possible implementation manner of the twelfth aspect, in a second possible implementation manner, the method further includes:

receiving, by the network controller, utilization information of the air interface-specific path sent by the base station, and utilization information of the network-specific path sent by a gateway on the network-specific path; and storing the utilization information of the air interface-specific path and the utilization information of the network-specific path in the policy database, and allocating the air interface-specific path resource according to the utilization information of the air interface-specific path, and allocating the network-specific path resource according to the utilization information of the network-specific path, and sending control information to the base station according to the utilization information of the air interface-specific path, so that the base station adjusts allocation of the air interface-specific path resource.

With reference to the twelfth aspect or with reference to the first or the second possible implementation manner of the twelfth aspect, in a third possible implementation manner, the method further includes:

receiving, by the network controller, the utilization information of the air interface-specific path sent by the base station and the utilization information of the network-specific path sent by the gateway on the network-specific path; and storing the utilization information of the air interface-specific path and the utilization information of the network-specific path in the policy database, and charging according to the utilization information of the air interface-specific path and the utilization information of the network-specific path.

A thirteenth aspect of the embodiments of the present disclosure provides a computer storage medium, where the computer storage medium stores a program, and the program executes all or some steps of the transmission method provided in the twelfth aspect of the embodiments of the present disclosure.

Implementation of the embodiments of the present disclosure brings the following beneficial effects:

A terminal receives configuration information of an air interface-specific path sent by a base station, and uses the air interface-specific path to send application data that is discontinuously transmitted and has a length less than a preset threshold, without a need of exchanging a large amount of network signaling with the base station to establish a bearer connection. This saves signaling resources, and reduces consumption and occupation of air interface resources. In addition, an independent air interface-specific path does not cause interference to a normal network service, ensuring normal running of the network service.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

A system architecture in the present disclosure may include at least one terminal, at least one base station, a network controller, and at least one gateway.

Figure 1:
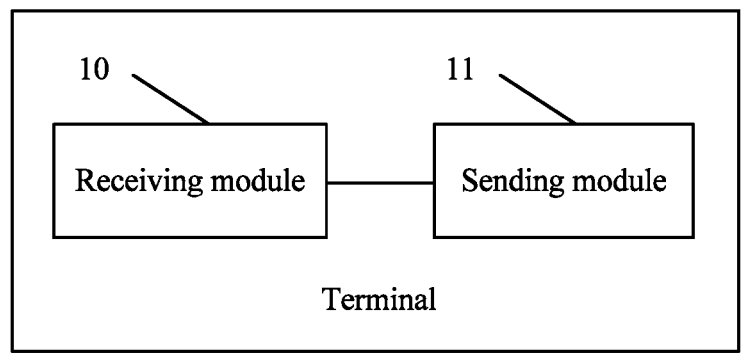
FIG. 1 is a schematic diagram of composition of an embodiment of a terminal in the embodiments of the present disclosure.

Refer to FIG. 1. FIG. 1 is a schematic diagram of composition of an embodiment of a terminal in the embodiments of the present disclosure. In this embodiment, the terminal includes:

a receiving module 10, configured to receive configuration information of at least one air interface-specific path sent by a base station, where the air interface-specific path is used to transmit application data corresponding to at least one application; and a sending module 11, configured to: if the to-be-sent application data is discontinuously transmitted and has a length less than a preset threshold, use the at least one air interface-specific path to send the application data to the base station.

Optionally, the terminal is in an idle state, and the configuration information includes time-frequency resource information and link resource information of the air interface-specific path. When the terminal is connected to a network for the first time, or moves from one base station to another base station, configuration information of a dedicated path needs to be obtained from the network. The configuration information may be configured in a system message of the base station for broadcast. After receiving the configuration information, the terminal may read from the configuration information and store information about a resource allocated by the base station to the terminal, so that when the terminal in an idle state transmits some application data that has a relatively small length and that is discontinuously transmitted, the terminal needs to use only the air interface-specific path to directly transmit such data, without a need of exchanging a large amount of network signaling to establish a connection to the base station which occupies a large quantity of air interface resources.

Resource blocks included in the time-frequency resource information are discontinuous in a time domain and/or a frequency domain, and different resource blocks are used to transmit application data of different applications, or different resource blocks are used to transmit application data of different types of applications, where applications may be classified by service quality, delay, priority, or the like. This is not limited herein.

After reading the time-frequency resource information, the terminal needs to identify and determine an application or an application type corresponding to each time-frequency resource, so as to select an appropriate time-frequency resource to send data.

The terminal and another terminal may contend for using a time-frequency resource of the air interface-specific path. Alternatively, the receiving module 10 is further configured to receive time-frequency resource allocation information sent by the base station, and the sending module 11 is further configured to use the time-frequency resource of the air interface-specific path according to the time-frequency resource allocation information, so as to implement contention-free access of a specific terminal. In addition, the time-frequency resource may further be monitored and dynamically adjusted by a network controller to fully meet a transmission requirement of the terminal.

It should be noted that, theoretically, a terminal in a connected state may also use the air interface-specific path. When the terminal is in a connected state, that is, the terminal is connected to the base station by using a normal path, a transmission path with larger bandwidth may be used, and transmission efficiency thereof is quite high, and therefore, the normal path may be preferentially used to transmit the application data that is discontinuously transmitted and has a length less than the preset threshold. Certainly, if there is an independent logical channel for a service of the air interface-specific path, that is, the terminal can recognize a service of this type, the terminal may select the air interface-specific path for transmission as well, so as to make fuller use of resources. Specifically, during selection of a path, a base station may send control signaling for control, and the terminal in a connected state receives the control signaling sent by the base station, and determines, according to the control signaling, whether to use the air interface-specific path to transmit the application data that is discontinuously transmitted and has a length less than the preset threshold.

The control signaling is physical layer signaling or Media Access Control layer signaling, or application layer signaling, which is transmitted by using the normal path, and may include indication information that indicates whether to use the air interface-specific path, and may further include some information about path switching and resource configuration, where the indication information may be sent by using the normal path, or may be indicated in the physical layer signaling, or may be indicated in the Media Access Control (MAC) layer signaling or the application layer signaling. The receiving module 10 is further configured to receive the control signaling sent by the base station, and determine whether the control signaling carries indication information of using the air interface-specific path; if the control signaling carries the indication information of using the air interface-specific path, use the air interface-specific path to transmit the application data that is discontinuously transmitted and has a length less than the preset threshold; or if the control signaling does not carry the indication information of using the air interface-specific path, use the normal path to transmit the application data that is discontinuously transmitted and has a length less than the preset threshold. Because the terminal in an idle state does not need to establish a bearer connection by using a large amount of network signaling, and does not need to occupy a large quantity of air interface resources, the air interface-specific path in this embodiment of the present disclosure also applies to terminals in an idle state.

In a possible implementation manner, the terminal may further include a determining module, which is configured to: before sending application data, determine whether the to-be-sent application data is discontinuously transmitted and has a length less than a preset threshold.

If yes, the sending module 11 uses the air interface-specific path to send the application data to the base station, so that the base station sends the application data to a gateway by using a network-specific path corresponding to the air interface-specific path.

If no, the terminal establishes a connection to the base station in a conventional manner in the prior art, and the terminal maintains a connected state and uses a conventional transmission path to transmit the to-be-sent data.

Optionally, the application data that is discontinuously transmitted and has a length less than the preset threshold includes application signaling that is discontinuously transmitted and has a length less than a preset threshold and/or a packet that is discontinuously transmitted and has a length less than a preset threshold. For example, the application signaling herein may be Session Initiation Protocol (SIP) signaling, a handshake protocol of the Transmission Control Protocol/Internet Protocol (TCP/IP), heartbeat information, a state report, a link, a media transmission negotiation message, or the like. The packet herein may be some relatively short machine to machine (M2M) transmitted data, and the like.

When determining to use the air interface-specific path to perform transmission, the terminal may use a preset algorithm to select an appropriate time-frequency resource based on a specific identifier of the terminal according to a dedicated path resource allocated by a system, channel division of a dedicated path (such as time division, frequency division, or code division, or different combinations thereof), a size of data that needs to be transmitted, and a system-predefined encoding manner, to perform the transmission.

A size of each time-frequency resource block resulting from division may be predefined, or may be dynamically changed by means of a system message. In the case of dynamic changing by means of a system message, the terminal needs to dynamically change the encoding manner, the size of transmitted data, and the like according to received information. Generally, a manner of dynamically changing the encoding manner and a size of a frequency domain resource block according to the system message is more convenient and flexible. In addition, in a specific time-frequency resource block, there may be multiple choices of transmission methods, such as code division, or carrier sense multiple access (CSMA).

Because multiple time-frequency resource blocks are scheduled each time, the terminal needs to select one of the time-frequency resource blocks to perform the transmission. The selection may be random, or the time-frequency resource block may be obtained by using a preset algorithm and according to a specific identifier of the terminal. No limitation is imposed on a specific method in this embodiment of the present disclosure.

In this embodiment of the present disclosure, transmission of the application signaling that is discontinuously transmitted and has a length less than the preset threshold and/or the packet that is discontinuously transmitted and has a length less than the preset threshold is separated from transmission of normal service signaling, so that a service related to normal network signaling is not interfered with. Therefore, application signaling serves applications, and network signaling serves network services. Application signaling and network signaling are independent of each other.

It should be noted that for the terminal in an idle state, when the application signaling is continuously generated, or when a large amount of data is transmitted because of the transmission of the application signaling, a normal transmission manner, that is, access, is still used. This is because continuous transmission of application signaling is usually accompanied by data transmission, and if there is a large amount of transmitted data, it is worth establishing a network bearer to transmit the application signaling and data. However, for the application signaling or the packet that is discontinuously transmitted and has a relatively small length, because a time interval of transmission is relatively long, a network may need to repeatedly establish and delete a bearer. For transmission of application signaling or a packet of this type, the transmission method in this embodiment of the present disclosure is used. Likewise, when a packet is relatively large, or there is continuous packet transmission, transmission is performed by using the normal transmission path. After the application data is sent to the base station by using the air interface-specific path, the base station may send the application data to the gateway by using a network-specific path mapped with the air interface-specific path, and the gateway transmits the application data to a service provider. However, for the terminal in a connected state, the terminal may freely select a path for transmission, or the base station may provide an indication, and the terminal selects a transmission path according to received indication information of the base station. For example, in a normal case, the terminal in a connected state may preferentially use the normal path to transmit the application data, and when air interface resources of the base station are relatively in shortage, and the air interface-specific path is idle, the base station may send an indication message to the terminal to instruct the terminal to use the air interface-specific path to transmit the application data.

Corresponding to sending the application data by the terminal, the receiving module 10 may further be configured to receive application data that is sent by the base station by using the at least one air interface-specific path.

In this embodiment, a terminal receives configuration information of an air interface-specific path sent by a base station, and uses the air interface-specific path to send application data that is discontinuously transmitted and has a length less than a preset threshold, without a need of exchanging a large amount of network signaling with the base station to establish a bearer connection. This saves signaling resources, and reduces consumption and occupation of air interface resources. In addition, an independent air interface-specific path does not cause interference to a normal network service, ensuring normal running of the network service.

Figure 2:
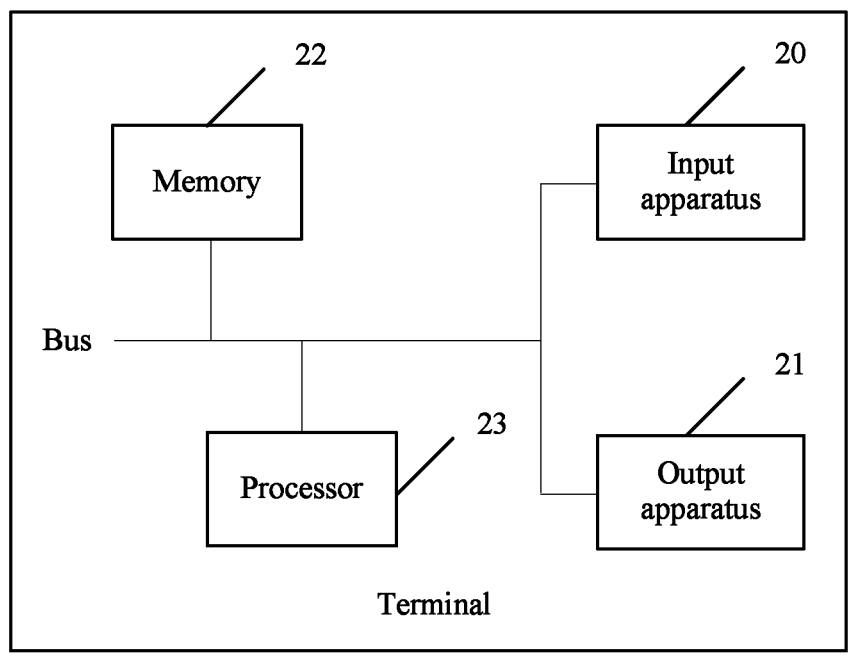
FIG. 2 is a schematic diagram of composition of another embodiment of a terminal in the embodiments of the present disclosure.

Refer to FIG. 2. FIG. 2 is a schematic diagram of composition of another embodiment of a terminal in the embodiments of the present disclosure. In this embodiment, the terminal includes:

an input apparatus 20, an output apparatus 21, a memory 22, and a processor 23.

The input apparatus 20, the output apparatus 21, the memory 22, and the processor 23 are connected by using a bus.

The memory 22 is configured to store a program, and the processor 23 is configured to call the program to execute the following steps:

receiving configuration information of at least one air interface-specific path sent by a base station, where the air interface-specific path is used to transmit application data corresponding to at least one application; and if the to-be-sent application data is discontinuously transmitted and has a length less than a preset threshold, using the at least one air interface-specific path to send the application data to the base station.

Optionally, the terminal is in an idle state.

The configuration information of the air interface-specific path includes time-frequency resource information and link resource information of the air interface-specific path.

In a possible implementation manner, the terminal and another terminal contend for using a time-frequency resource of the air interface-specific path.

Alternatively, the processor 23 is further configured to receive time-frequency resource allocation information sent by the base station, and use a time-frequency resource of the air interface-specific path according to the time-frequency resource allocation information.

The processor 23 is further configured to receive application data that is sent by the base station by using the at least one air interface-specific path.

In a possible implementation manner, if the terminal is in a connected state, the processor 23 is further configured to receive control signaling sent by the base station, and if the control signaling carries indication information of using the air interface-specific path, the processor is further configured to use the air interface-specific path to transmit the application data that is discontinuously transmitted and has a length less than the preset threshold.

Figure 3:
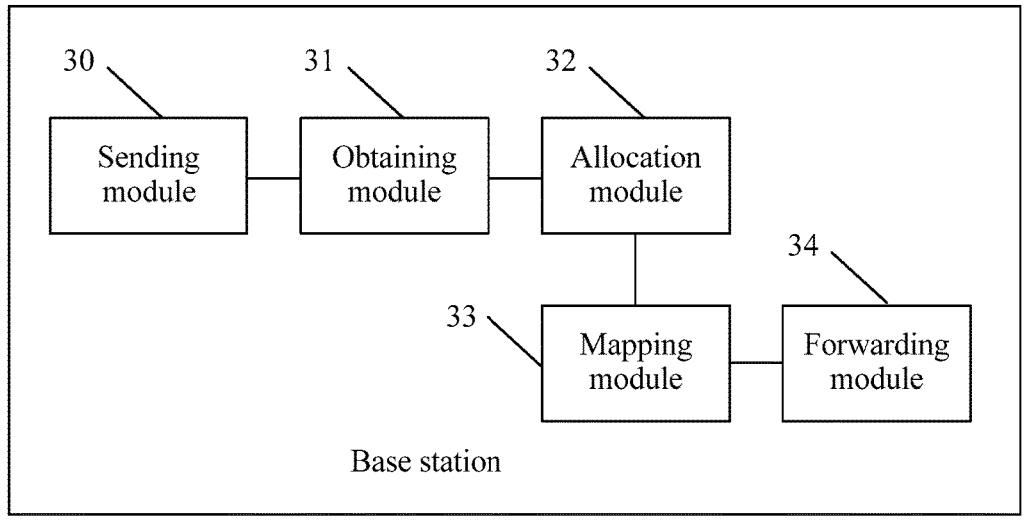
FIG. 3 is a schematic diagram of composition of an embodiment of a base station in the embodiments of the present disclosure.

Refer to FIG. 3. FIG. 3 is a schematic diagram of composition of an embodiment of a base station in the embodiments of the present disclosure. In this embodiment, the base station includes:

a sending module 30, configured to send an air interface resource request to a network controller, requesting the network controller to allocate an air interface-specific path resource;

an obtaining module 31, configured to obtain an air interface-specific path resource allocated by the network controller;

an allocation module 32, configured to allocate the air interface-specific path resource to a terminal;

a mapping module 33, configured to map at least one air interface-specific path with at least one network-specific path; and a forwarding module 34, configured to receive application data that is sent by the terminal by using the at least one air interface-specific path and that is discontinuously transmitted and has a length less than a preset threshold, and forward the application data to the gateway by using the at least one network-specific path mapped with the at least one air interface-specific path, where both the air interface-specific path and the network-specific path are used to transmit application data corresponding to at least one application.

The air interface-specific path resource includes time-frequency resource information and link resource information.

The forwarding module 34 is further configured to receive application data that is sent by the gateway by using the at least one network-specific path and that is discontinuously transmitted and has a length less than a preset threshold, and forward the application data to the terminal by using the at least one air interface-specific path mapped with the at least one network-specific path.

The allocation module 32 is interfaced with the network controller, and in addition, when the base station has a control request, the module is also interfaced with the network controller. The allocation module 32 may configure the air interface-specific path resource according to a resource control command of the network controller. In addition, the module may further receive collection and analysis information from air interface-specific path information, such as information about resource usage and a bit error status, and then may adjust air interface resource allocation according to the information, for example, resource reallocation needs to be performed, the information needs to be notified to the network controller, so that the network controller can perform resource control for one application or one type of application. The mapping module 33 needs to manage a mapping relationship between the air interface-specific path and the network-specific path. When one application or one type of application is increased or decreased, the mapping module 33 changes the mapping relationship between the air interface-specific path and the network-specific path.

The forwarding module 34 mainly processes transmission and reception of uplink and downlink data on a dedicated path. In addition, the module needs to notify the allocation module 32 of air interface-related statistical information, which includes but is not limited to instantaneous information, bit error information, retransmission information, resource contention information, and the like of resource utilization. The allocation module 32 sends the statistical information to the network controller, which analyzes resource utilization information of a dedicated path, and finally forms resource allocation decision information.

Figure 4:
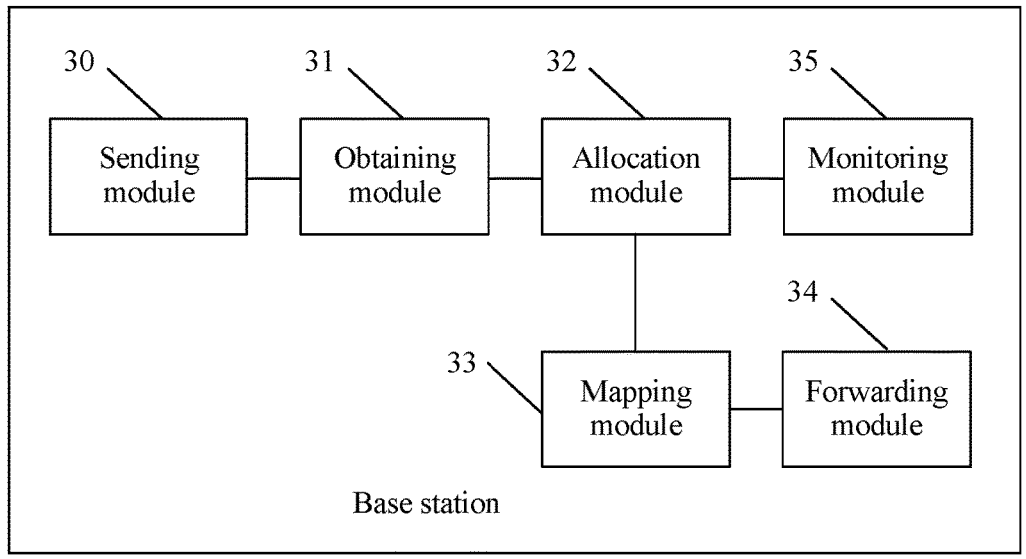
FIG. 4 is a schematic diagram of composition of another embodiment of a base station in the embodiments of the present disclosure.

Refer to FIG. 4. FIG. 4 is a schematic diagram of composition of another embodiment of a base station in the embodiments of the present disclosure. Compared with the embodiment shown in FIG. 3, in this embodiment, the base station further includes:

a monitoring module 35, configured to monitor utilization information of the air interface-specific path.

The allocation module 32 is further configured to adjust the air interface-specific path resource according to the utilization information of the air interface-specific path.

The sending module 30 is further configured to send the adjusted air interface path resource to the terminal for use by the terminal.

Figure 5:
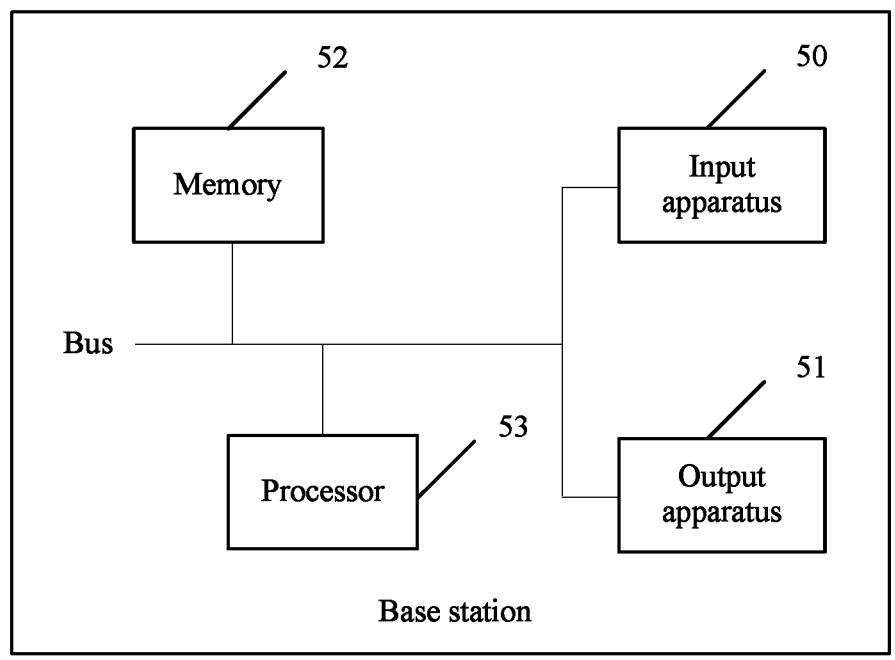
FIG. 5 is a schematic diagram of composition of a third embodiment of a base station in the embodiments of the present disclosure.

Refer to FIG. 5. FIG. 5 is a schematic diagram of composition of a third embodiment of a base station in the embodiments of the present disclosure. In this embodiment, the base station includes:

an input apparatus 50, an output apparatus 51, a memory 52, and a processor 53.

The memory 52 is configured to store a program, and the processor 53 is configured to call the program to execute the following steps:

sending an air interface resource request to a network controller, requesting the network controller to allocate an air interface-specific path resource;

obtaining an air interface-specific path resource allocated by the network controller;

allocating the air interface-specific path resource to a terminal;

mapping at least one air interface-specific path with at least one network-specific path; and receiving application data that is sent by the terminal by using the at least one air interface-specific path and that is discontinuously transmitted and has a length less than a preset threshold, and forwarding the application data to the gateway by using the at least one network-specific path mapped with the at least one air interface-specific path, where both the air interface-specific path and the network-specific path are used to transmit application data corresponding to at least one application.

The air interface-specific path resource includes time-frequency resource information and link resource information.

In a possible implementation manner, the processor 53 is further configured to execute the following steps:

monitoring utilization information of the air interface-specific path;

adjusting the air interface-specific path resource according to the utilization information of the air interface-specific path; and sending the adjusted air interface path resource to the terminal for use by the terminal.

The processor 53 is further configured to receive application data that is sent by the gateway by using the at least one network-specific path and that is discontinuously transmitted and has a length less than a preset threshold, and forward the application data to the terminal by using the at least one air interface-specific path mapped with the at least one network-specific path.

Figure 6:
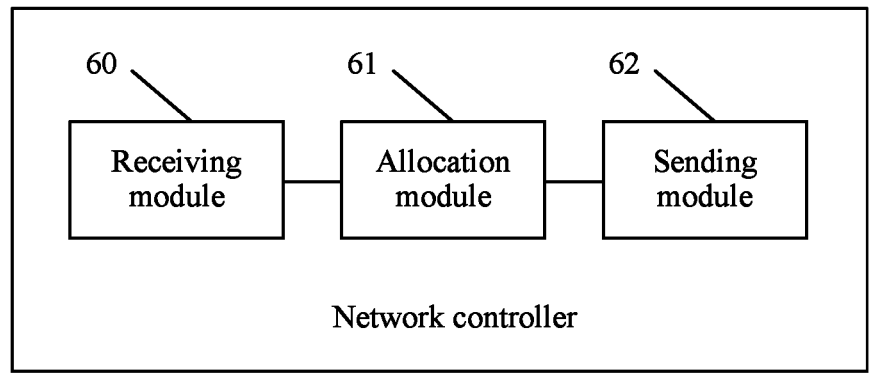
FIG. 6 is a schematic diagram of composition of an embodiment of a network controller in the embodiments of the present disclosure.

Refer to FIG. 6. FIG. 6 is a schematic diagram of composition of an embodiment of a network controller in the embodiments of the present disclosure. In this embodiment, the network controller includes:

a receiving module 60, configured to receive a first resource control request sent by a base station;

an allocation module 61, configured to allocate an air interface-specific path resource to the base station; where the receiving module 60 is further configured to receive a second resource control request sent by a gateway; and the allocation module 61 is further configured to allocate a network-specific path resource to the gateway; and a sending module 62, configured to send a control instruction to the base station, where the control instruction is used to instruct the base station to instruct a terminal to use at least one air interface-specific path and at least one network-specific path to send application data that is discontinuously transmitted and has a length less than a preset threshold, where both the air interface-specific path and the network-specific path are used to transmit application data corresponding to at least one application.

The allocation module 61 allocates the air interface-specific path resource to the base station and allocates the network-specific path resource to the gateway, based on a policy database.

In a possible implementation manner, the receiving module 60 is further configured to receive utilization information of the air interface-specific path sent by the base station, and utilization information of the network-specific path sent by a gateway on the network-specific path.

The sending module 62 is further configured to store the utilization information of the air interface-specific path and the utilization information of the network-specific path in the policy database.

The allocation module 61 is further configured to allocate the air interface-specific path resource according to the utilization information of the air interface-specific path, and allocate the network-specific path resource according to the utilization information of the network-specific path, and send control information to the base station according to the utilization information of the air interface-specific path, so that the base station adjusts allocation of the air interface-specific path resource.

Alternatively, the receiving module 60 is further configured to receive the utilization information of the air interface-specific path sent by the base station and the utilization information of the network-specific path sent by the gateway on the network-specific path.

The sending module 62 is further configured to store the utilization information of the air interface-specific path and the utilization information of the network-specific path in the policy database.

In a possible implementation manner, the network controller further includes:

a charging module 63, configured to charge according to the utilization information of the air interface-specific path and the utilization information of the network-specific path.

The charging information may be only generated charging information, which is used by a network to count network resources consumed by one application or one type of application; or may be application-based charging data, which is used for charging on a third path, and a service provider is charged according to the information.

The policy database mainly maintains policy control information of the third path, and the module may also provide an open interface to a third party. When performing resource allocation, the network controller needs to request the policy database to determine a control policy for dedicated path resource allocation. The control policy may be a limitation on a bandwidth size of one application or one type of application, or may be a limitation on a traffic volume of one application or one type of application. A result of the charging information may also affect a policy change. For example, for one application or one type of application, traffic in a time period is limited, and when traffic or bandwidth of this type of application exceeds a specific value, transmission bandwidth of this type of application is controlled, so as to reduce the bandwidth of this type of application, and maintain running of another normal service.

In a possible implementation manner, the policy database may be stored on the network controller as a component, or certainly, may be stored on an external server, in which case the network controller initiates a request to obtain information in the policy database.

The information in the policy database may include a preset allocation policy, such as a policy of allocation based on resource usage of an entire network, or a policy of allocation based on a capacity of an entire system, or a policy based on network earnings. Certainly, allocation may be performed also according to a resource requirement that may be carried by a base station in a resource configuration request. This is not limited herein.

The charging module 63 mainly collects charging statistical information of each gateway and base station, and feeds back the information to a policy control module under control of a specific policy, so that the network controller controls the dedicated path resource.

Figure 7:
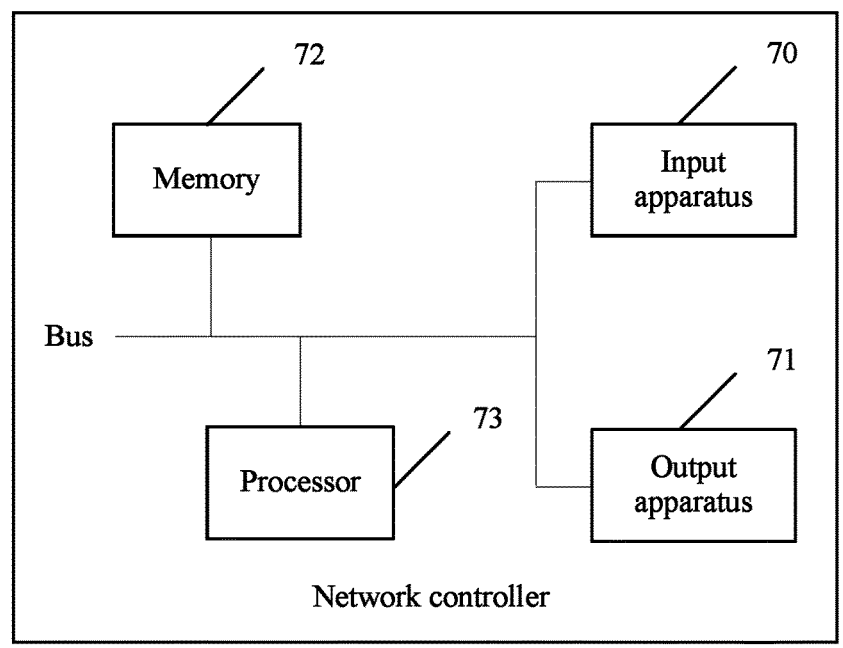
FIG. 7 is a schematic diagram of composition of another embodiment of a network controller in the embodiments of the present disclosure.

Refer to FIG. 7. FIG. 7 is a schematic diagram of composition of another embodiment of a network controller in the embodiments of the present disclosure. In this embodiment, the network controller includes:

an input apparatus 70, an output apparatus 71, a memory 72, and a processor 73.

The memory 72 is configured to store a program, and the processor 73 is configured to call the program to execute the following steps:

receiving a first resource control request sent by a base station, and allocating an air interface-specific path resource to the base station;

receiving a second resource control request sent by a gateway, and allocating a network-specific path resource to the gateway; and sending a control instruction to the base station, where the control instruction is used to instruct the base station to instruct a terminal to use at least one air interface-specific path and at least one network-specific path to send application data that is discontinuously transmitted and has a length less than a preset threshold, where both the air interface-specific path and the network-specific path are used to transmit application data corresponding to at least one application.

The processor 73 allocates the air interface-specific path resource to the base station and allocates the network-specific path resource to the gateway, based on a policy database.

In a possible implementation manner, the processor 73 is further configured to: receive utilization information of the air interface-specific path sent by the base station, and utilization information of the network-specific path sent by a gateway on the network-specific path;

store the utilization information of the air interface-specific path and the utilization information of the network-specific path in the policy database; and allocate the air interface-specific path resource according to the utilization information of the air interface-specific path, and allocate the network-specific path resource according to the utilization information of the network-specific path, and send control information to the base station according to the utilization information of the air interface-specific path, so that the base station adjusts allocation of the air interface-specific path resource.

Alternatively, the processor 73 is further configured to: receive the utilization information of the air interface-specific path sent by the base station and the utilization information of the network-specific path sent by the gateway on the network-specific path;

store the utilization information of the air interface-specific path and the utilization information of the network-specific path in the policy database; and charge according to the utilization information of the air interface-specific path and the utilization information of the network-specific path.

Figure 8:
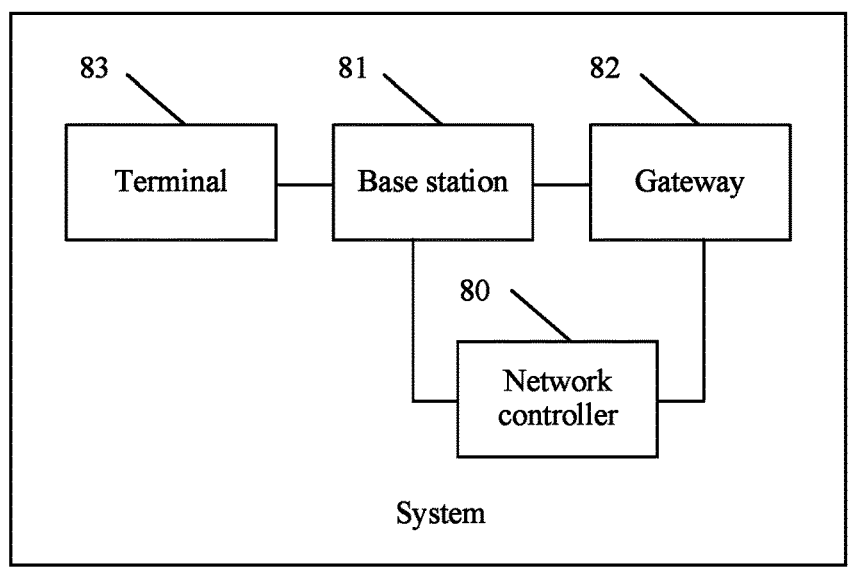
FIG. 8 is a schematic diagram of composition of a system according to an embodiment of the present disclosure.

Refer to FIG. 8. FIG. 8 is a schematic diagram of composition of a system according to an embodiment of the present disclosure. In this embodiment, the system includes:

a terminal 80 according to any embodiment shown in FIG. 1 or FIG. 2 of the present disclosure;

a base station 81 according to any embodiment shown in FIG. 3 to FIG. 5 of the present disclosure;

a network controller 82 according to any embodiment shown in FIG. 6 and FIG. 7 of the present disclosure; and a gateway 83, configured to connect to the base station by using at least one network-specific path, and transmit application data that is discontinuously transmitted and has a length less than a preset threshold.

In a process of transmitting application data by using an air interface-specific path and the network-specific path, the terminal 80 is mainly configured to:

receive configuration information of the air interface-specific path sent by the base station 81; and use the air interface-specific path to send the application data that is discontinuously transmitted and has a length less than the preset threshold.

The base station 81 is mainly configured to:

complete establishment of the network-specific path with the gateway 83 and a service provider;

complete mapping from the air interface-specific path to the network-specific path;

implement air interface resource allocation, adjustment, and notification based on a system policy;

collect statistics on and analyze usage of an air interface path resource; and forward the data sent by the terminal, and forward the data sent by the gateway.

The network controller 82 is mainly configured to:

receive or request policy control data of a dedicated path to implement allocation and management of a network-specific path resource, and allocation control of an air interface-specific path resource; and collect utilization information of the dedicated path resource (including the air interface-specific path resource and the network-specific path resource), and adjust dedicated path resource allocation and service charging, and the like.

The gateway 83 is mainly configured to:

receive application data sent by the base station, and forward the application data to a service provider, and forward, to the base station, application data sent by the service provider.

Figure 9:
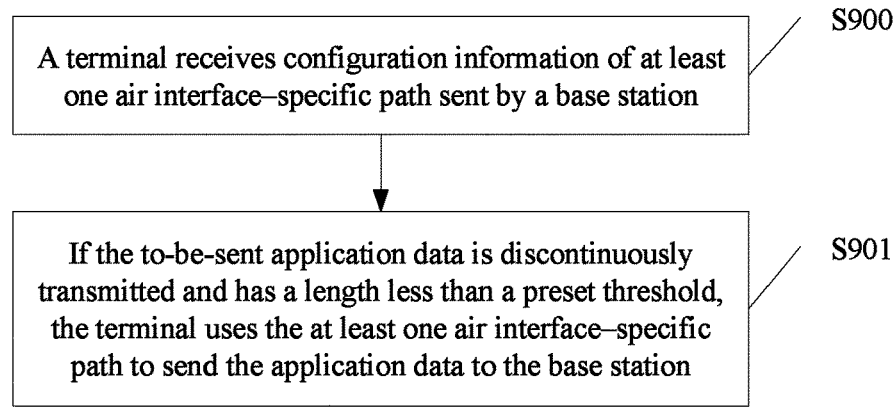
FIG. 9 is a schematic flowchart of an embodiment of a transmission method in the embodiments of the present disclosure.

Refer to FIG. 9. FIG. 9 is a schematic flowchart of an embodiment of a transmission method in the embodiments of the present disclosure. In this embodiment, the method includes the following steps:

S900. A terminal receives configuration information of at least one air interface-specific path sent by a base station.

Optionally, the terminal is in an idle state, and the configuration information includes time-frequency resource information and link resource information of the air interface-specific path.

S901. If the to-be-sent application data is discontinuously transmitted and has a length less than a preset threshold, the terminal uses the at least one air interface-specific path to send the application data to the base station.

Optionally, the application data that is discontinuously transmitted and has a length less than the preset threshold includes application signaling that is discontinuously transmitted and has a length less than a preset threshold and/or a packet that is discontinuously transmitted and has a length less than a preset threshold.

For description related to an air interface-specific path resource and sending of the application data, refer to the embodiments of the terminal, and details are not described herein again.

In a possible implementation manner, before step S901, the terminal may further determine whether the to-be-sent data is the application data that is discontinuously transmitted and has a length less than the preset threshold.

If yes, the terminal executes step S901; if no, the terminal establishes a connection to the base station in a conventional manner in the prior art, and the terminal maintains a connected state and uses a conventional transmission path to transmit the to-be-sent data.

Another aspect of the embodiments of the present disclosure provides a computer storage medium, where the computer storage medium stores a program, and the program executes the steps according to any embodiment shown in FIG. 9.

Figure 10:
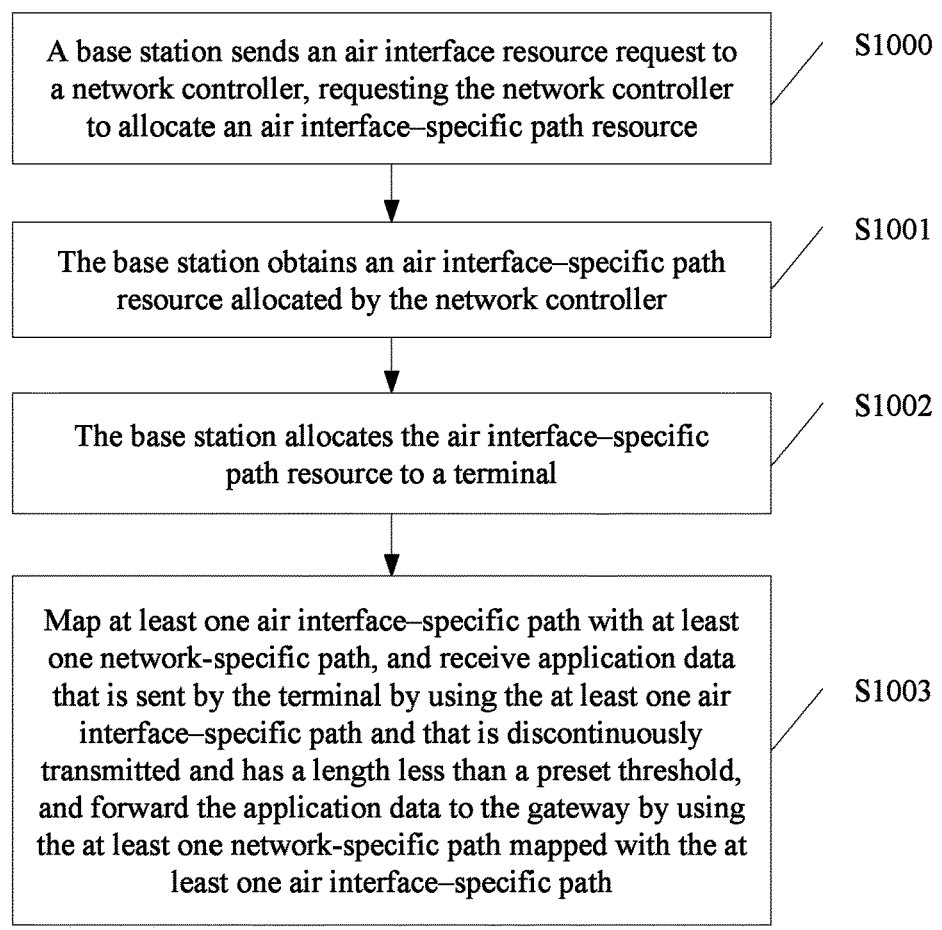
FIG. 10 is a schematic flowchart of another embodiment of a transmission method in the embodiments of the present disclosure.

Refer to FIG. 10. FIG. 10 is a schematic flowchart of another embodiment of a transmission method in the embodiments of the present disclosure. In this embodiment, the method includes the following steps:

S1000. A base station sends an air interface resource request to a network controller, requesting the network controller to allocate an air interface-specific path resource.

S1001. The base station obtains an air interface-specific path resource allocated by the network controller.

S1002. The base station allocates the air interface-specific path resource to a terminal.

S1003. Map at least one air interface-specific path with at least one network-specific path, and receive application data that is sent by the terminal by using the at least one air interface-specific path and that is discontinuously transmitted and has a length less than a preset threshold, and forward the application data to the gateway by using the at least one network-specific path mapped with the at least one air interface-specific path.

Both the air interface-specific path and the network-specific path are used to transmit application data corresponding to at least one application.

The air interface-specific path resource includes time-frequency resource information and link resource information.

In a possible implementation manner, the method may further include:

monitoring, by the base station, utilization information of the air interface-specific path;

adjusting the air interface-specific path resource according to the utilization information of the air interface-specific path; and sending the adjusted air interface path resource to the terminal for use by the terminal; and receiving, by the base station, application data that is sent by the gateway by using the at least one network-specific path and that is discontinuously transmitted and has a length less than a preset threshold, and forwarding the application data to the terminal by using the at least one air interface-specific path mapped with the at least one network-specific path.

Another aspect of the embodiments of the present disclosure provides a computer storage medium, where the computer storage medium stores a program, and the program executes the steps according to any embodiment shown in FIG. 10.

Figure 11:
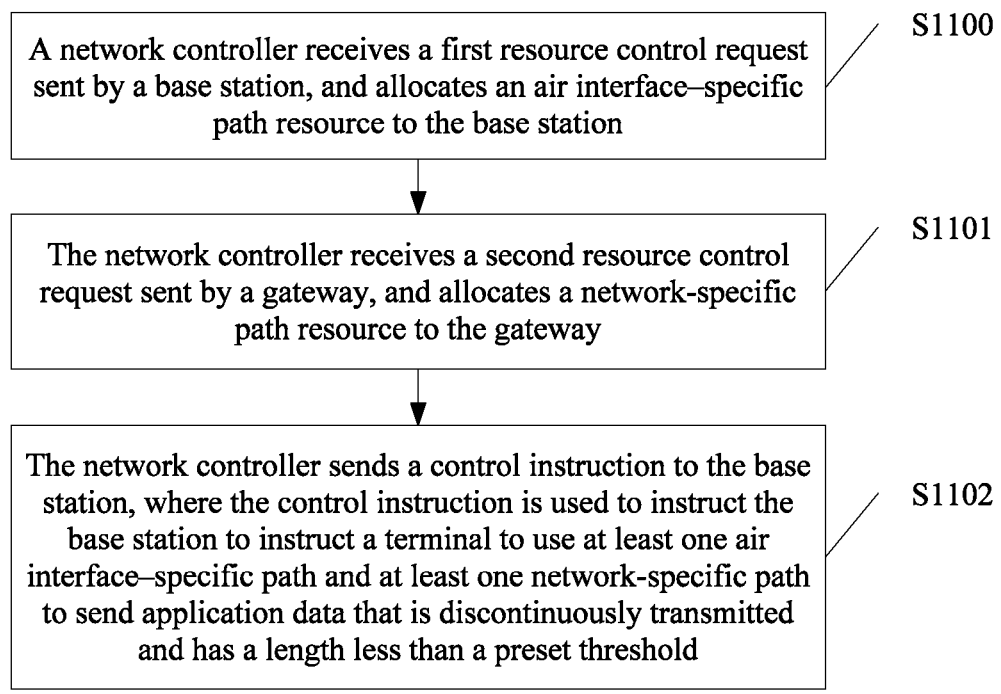
FIG. 11 is a schematic flowchart of a third embodiment of a transmission method in the embodiments of the present disclosure.

Refer to FIG. 11. FIG. 11 is a schematic flowchart of a third embodiment of a transmission method in the embodiments of the present disclosure. In this embodiment, the method includes the following steps:

S1100. A network controller receives a first resource control request sent by a base station, and allocates an air interface-specific path resource to the base station.

S1101. The network controller receives a second resource control request sent by a gateway, and allocates a network-specific path resource to the gateway.

S1102. The network controller sends a control instruction to the base station, where the control instruction is used to instruct the base station to instruct a terminal to use at least one air interface-specific path and at least one network-specific path to send application data that is discontinuously transmitted and has a length less than a preset threshold.

Both the air interface-specific path and the network-specific path are used to transmit application data corresponding to at least one application.

The network controller allocates the air interface-specific path resource to the base station and allocates the network-specific path resource to the gateway, based on a policy database.

In a possible implementation manner, the method may further include:

receiving, by the network controller, utilization information of the air interface-specific path sent by the base station, and utilization information of the network-specific path sent by a gateway on the network-specific path; and storing the utilization information of the air interface-specific path and the utilization information of the network-specific path in the policy database, and allocating the air interface-specific path resource according to the utilization information of the air interface-specific path, and allocating the network-specific path resource according to the utilization information of the network-specific path, and sending control information to the base station according to the utilization information of the air interface-specific path, so that the base station adjusts allocation of the air interface-specific path resource.

Alternatively, the method may further include:

receiving, by the network controller, the utilization information of the air interface-specific path sent by the base station and the utilization information of the network-specific path sent by the gateway on the network-specific path; and storing the utilization information of the air interface-specific path and the utilization information of the network-specific path in the policy database, and charging according to the utilization information of the air interface-specific path and the utilization information of the network-specific path.

Another aspect of the embodiments of the present disclosure provides a computer storage medium, where the computer storage medium stores a program, and the program executes the steps according to any embodiment shown in FIG. 11.

According to the description of the foregoing embodiments, the present disclosure has the following advantages:

A terminal receives configuration information of an air interface-specific path sent by a base station, and uses the air interface-specific path to send application data that is discontinuously transmitted and has a length less than a preset threshold, without a need of exchanging a large amount of network signaling with the base station to establish a bearer connection. This saves signaling resources, and reduces consumption and occupation of air interface resources. In addition, an independent air interface-specific path does not cause interference to a normal network service, ensuring normal running of the network service.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The terminal, the base station, the network controller, the system, and the transmission method provided in the embodiments of the present disclosure are described in detail above. The principles and implementation manners of the present disclosure are described herein through specific examples. The description of the foregoing embodiments is intended only to help understand the method and core ideas of the present disclosure. In addition, a person of ordinary skill in the art can make variations and modifications to the present disclosure in terms of the specific implementation manners and application scopes according to the ideas of the present disclosure. Therefore, the content of specification shall not be construed as a limitation on the present disclosure.

What is claimed is:

1. A base station, comprising
   a processor; and
   a memory configured to store a program that, when executed by the processor, causes the base station to perform:
   sending an air interface resource request to a network controller, wherein the air interface resource request requests the network controller to allocate an air interface-specific path resource;
   obtaining an air interface-specific path resource allocated by the network controller;
   allocating the air interface-specific path resource to a terminal;
   mapping at least one air interface-specific path with at least one network-specific path, wherein the at least one air interface-specific path is a path between the terminal and the base station, and is configured to transport application data that is discontinuous and has a length in bits less than a threshold;
   receiving application data that is discontinuous and has a length in bits less than the threshold from the terminal through the at least one air interface-specific path; and
   forwarding the application data to a gateway through the at least one network-specific path mapped with the at least one air interface-specific path,
   wherein both the at least one air interface-specific path and the at least one network-specific path are used to transmit application data corresponding to at least one application.

2. The base station according to claim 1, wherein the air interface-specific path resource comprises time-frequency resource information and link resource information.

3. The base station according to claim 1, wherein the processor is further configured to execute the program to cause the base station to perform:
   monitoring utilization information of the air interface-specific path;
   adjusting the air interface-specific path resource according to the utilization information of the air interface-specific path; and sending the adjusted air interface path resource to the terminal.

4. The base station according to claim 1, wherein the processor is further configured to execute the program to cause the base station to perform:
receiving application data that is discontinuous from the gateway through the at least one network-specific path; and
forwarding the application data received from the gateway to the terminal through the at least one air interface-specific path.

5. A transmission method, comprising:
sending, by a base station, an air interface resource request to a network controller, wherein the air interface resource request requests the network controller to allocate an air interface-specific path resource;
obtaining, by the base station, an air interface-specific path resource allocated by the network controller;
allocating, by the base station, the air interface-specific path resource to a terminal;
mapping at least one air interface-specific path with at least one network-specific path, wherein the at least one air interface-specific path is a path between the terminal and the base station, and is configured to transport application data that is discontinuous and has a length in bits less than a threshold;
receiving application data that is discontinuous and has a length in bits less than the threshold from the terminal through the at least one air interface-specific path; and
forwarding the application data to a gateway through the at least one network-specific path mapped with the at least one air interface-specific path,
wherein both the at least one air interface-specific path and the at least one network-specific path are used to transmit application data corresponding to at least one application.

6. The method according to claim 5, wherein the air interface-specific path resource comprises time-frequency resource information and link resource information.

* * * * *